(12) United States Patent
Boudaud

(10) Patent No.: US 6,392,858 B1
(45) Date of Patent: May 21, 2002

(54) ELECTRONIC TRIP DEVICE WITH PHASE RECONSTITUTION AND A CIRCUIT BREAKER COMPRISING SUCH A TRIP DEVICE

(75) Inventor: Dominique Boudaud, Seyssins (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/519,596

(22) Filed: Mar. 6, 2000

(30) Foreign Application Priority Data

Apr. 14, 1999 (FR) .......................................... 99 04848

(51) Int. Cl.$^7$ ................................................. H02H 3/00
(52) U.S. Cl. ..................... 361/93.6; 361/93.2; 361/76; 361/87
(58) Field of Search ................ 361/76, 87, 93.2, 361/93.6; 324/76.13, 76.52, 76.71, 76.77; 702/57–58, 64–66, 72, 117, 122, 183, 188–189, FOR 103, FOR 104, FOR 134, FOR 170

(56) References Cited

U.S. PATENT DOCUMENTS

| | | | | |
|---|---|---|---|---|
| 4,544,982 A | * | 10/1985 | Boothman et al. ............ 361/93 |
| 5,731,698 A | * | 3/1998 | Fujii et al. ................ 324/76.77 |
| 5,777,835 A | | 7/1998 | Innes .......................... 361/93.6 |
| 5,815,357 A | * | 9/1998 | Innes et al. ..................... 361/93 |
| 5,940,257 A | * | 8/1999 | Zavis ........................... 361/93 |

FOREIGN PATENT DOCUMENTS

| | | | |
|---|---|---|---|
| DE | 2723164 | 11/1978 | ............ H02H/3/08 |
| DE | 2609654 | 9/1997 | ............ H02H/3/08 |
| SU | 1534613 | 1/1990 | ............ H02H/7/085 |
| SU | 1758748 | 8/1992 | ............ H02H/3/08 |

* cited by examiner

Primary Examiner—Stephen W. Jackson

(57) ABSTRACT

The trip device with phase reconstitution comprises a processing unit comprising means for phase reconstitution receiving signals representive of the current signals supplied by sensors. The means for phase reconstitution comprise means for determining signals representative of the amplitudes of the current signals supplied by the two sensors, means for determining a signal representative of a phase shift between signals representative of the signals supplied by the two sensors and means for determining a signal representative of a phase current reconstituted according to the signals representative of the amplitudes and to the signal representative of a phase shift of the signals supplied by the two sensors. The circuit breaker comprises such a trip device.

10 Claims, 5 Drawing Sheets

US 6,392,858 B1

ELECTRONIC TRIP DEVICE WITH PHASE RECONSTITUTION AND A CIRCUIT BREAKER COMPRISING SUCH A TRIP DEVICE

BACKGROUND OF THE INVENTION

The invention relates to a trip device with phase reconstitution comprising:

- at least two sensors arranged on main conductors to be protected, and
- a processing unit comprising means for processing the current signals connected to the sensors, means for phase reconstitution receiving signals representative of the current signals supplied by the sensors, and means for processing tripping functions connected to the means for processing the current signals and to the means for reconstitution. The invention also relates to a circuit breaker comprising such a trip device.

Trip devices with phase reconstitution generally comprise two sensors arranged on two main phase conductors and reconstitute a signal representative of the third phase when the power system is a three-phase system. Each sensor can also surround two main conductors so that measurement of the current will be representative of the sum of two phase currents. These types of trip devices are described in particular in the U.S. Pat. Nos. 5,777,835 and 5,815,357.

For reconstitution of a phase which is not measured, sampling means supply current signal samples at regular intervals. Processing means comprising a microprocessor then compute the missing phase signal point by point.

In this processing mode, computation of a missing phase is liable not to be sufficiently precise. Current sensors, such as magnetic circuit current transformers, do in fact comprise non-linear responses. The non-linearity of the responses is due in particular to saturation of the magnetic circuits at high currents.

Thus, as soon as the currents in the main conductors increase, point by point reconstitution becomes imprecise.

SUMMARY OF THE INVENTION

The object of the invention is to achieve an electronic trip device with phase reconstitution enabling precision of reconstitution to be achieved over a wide measuring range.

In a trip device according to the invention, the means for phase reconstitution comprise:

- first determining means to determine signals representative of the amplitudes of the current signals supplied by the two sensors,
- second determining means to determine a signal representative of a phase shift between signals representative of the signals supplied by the two sensors, and
- third determining means connected to the first and second determining means to determine a signal representative of a phase current reconstituted according to the signals representative of the amplitudes and to the signal representative of a phase shift of the signals supplied by the two sensors.

In a preferred embodiment, the second determining means comprise means for computing the cosine of the phase shift between the signals representative of the signals supplied by the two sensors.

The second determining means preferably comprise means for determining times when the signals supplied by the current sensors pass zero in a predetermined direction, said times being a first time when a first signal passes zero, a second time when a second signal passes zero and a third time when a first signal again passes zero, a signal representative of the phase shift being appreciably proportional to the ratio of a time between the first and second times over a time between the first and third times corresponding to the period of the first signal.

In a preferred embodiment, the third determining means comprise first means for computing a product signal to compute the product of the signals representative of the amplitudes and of the signal representative of a phase shift.

Advantageously, the third determining means comprise second means for computing a sum signal to compute the sum of the squared amplitude signals and of the product signal.

The trip device preferably comprises means for determining zero-phase sequence current comprising a current sensor arranged on all of the main conductors.

In a preferred embodiment, the means for reconstitution use the signal supplied by the third determining means when at least one of the current signals supplied by the two sensors exceeds a first preset threshold.

Advantageously, each current sensor surrounds two main conductors.

In a four-pole embodiment, the trip device comprises at least three sensors arranged on main conductors to be protected, the first determining means determining signals representative of the amplitudes of the current signals supplied by the sensors, and the third determining means connected to the first and second determining means determining a signal representative of a phase current reconstituted according to the signals representative of the amplitudes, to the signal representative of a phase shift of the signals supplied by two sensors, and to a signal supplied by a third sensor.

A circuit breaker according to an embodiment of the invention comprises at least three contacts connected in series with main conductors and a trip device having the features defined above.

BRIEF DESCRIPTION OF THE DRAWINGS

Other advantages and features will become more clearly apparent from the following description of particular embodiments of the invention, given as non-restrictive examples only, and represented in the accompanying drawings in which.

DETAILED DESCRIPTION OF THE PREFERRED EMBODIMENT

Figure 1:
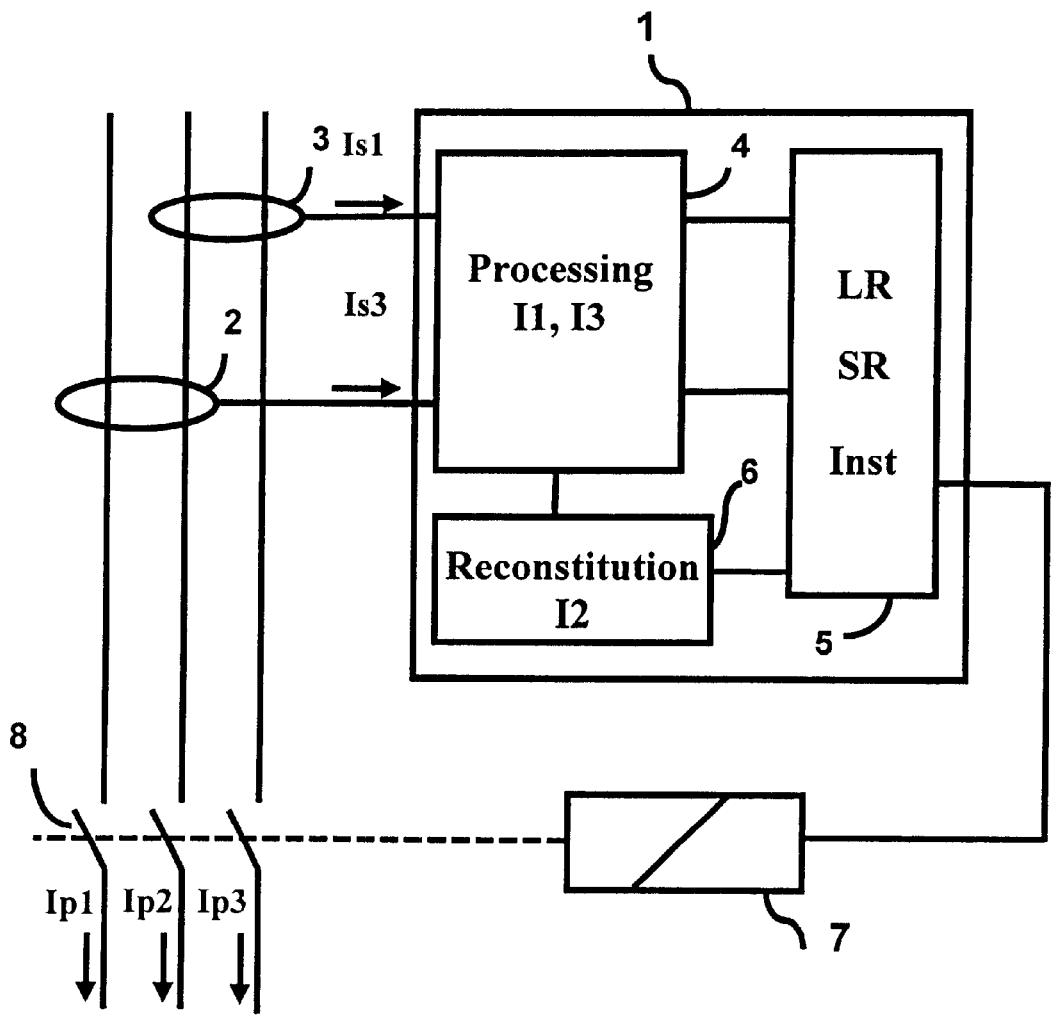
FIG. 1 represents the wiring diagram of a trip device with reconstitution of known type.

The electronic trip device of FIG. 1 comprises a processing unit 1 connected to two current sensors 2 and 3 to receive signals Is1 and Is3 representative of currents Ip1, Ip2 and Ip3 flowing in conductors 36 to be protected.

The signals Is1 and Is3 are applied to the input of a current signal processing circuit 4. The processing circuit 4 supplies to a tripping function processing circuit 5 signals representative of the currents measured and processed by the circuit 4.

A reconstitution circuit 6 connected to the processing circuits 4 and 5 receives signals representative of the measured currents and supplies a signal representative of the reconstituted phase. Thus, in the device of FIG. 1, the processing circuit 5 receives signals representative of the currents of the three phases flowing in the conductors to be protected.

The processing circuit 5 performs the tripping functions and supplies a tripping signal to a relay 7 when the current signals which it receives exceed thresholds during preset times. The tripping functions are notably long delay, short delay and instantaneous tripping functions. The relay then commands opening of contacts 8 via an opening mechanism.

The current sensors 2 or 3 generally comprise a magnetic circuit which gives rise to a non-linear response. For example, a current transformer is subject to saturation when the current flowing in a primary conductor 36 increases. In this case, a point-by-point reconstitution at each current sample is liable to give an erroneous phase reconstitution signal.

A trip device according to one embodiment of the invention has improved reconstitution means which prevent or limit reconstitution errors when the current signals are deformed.

Figure 2:
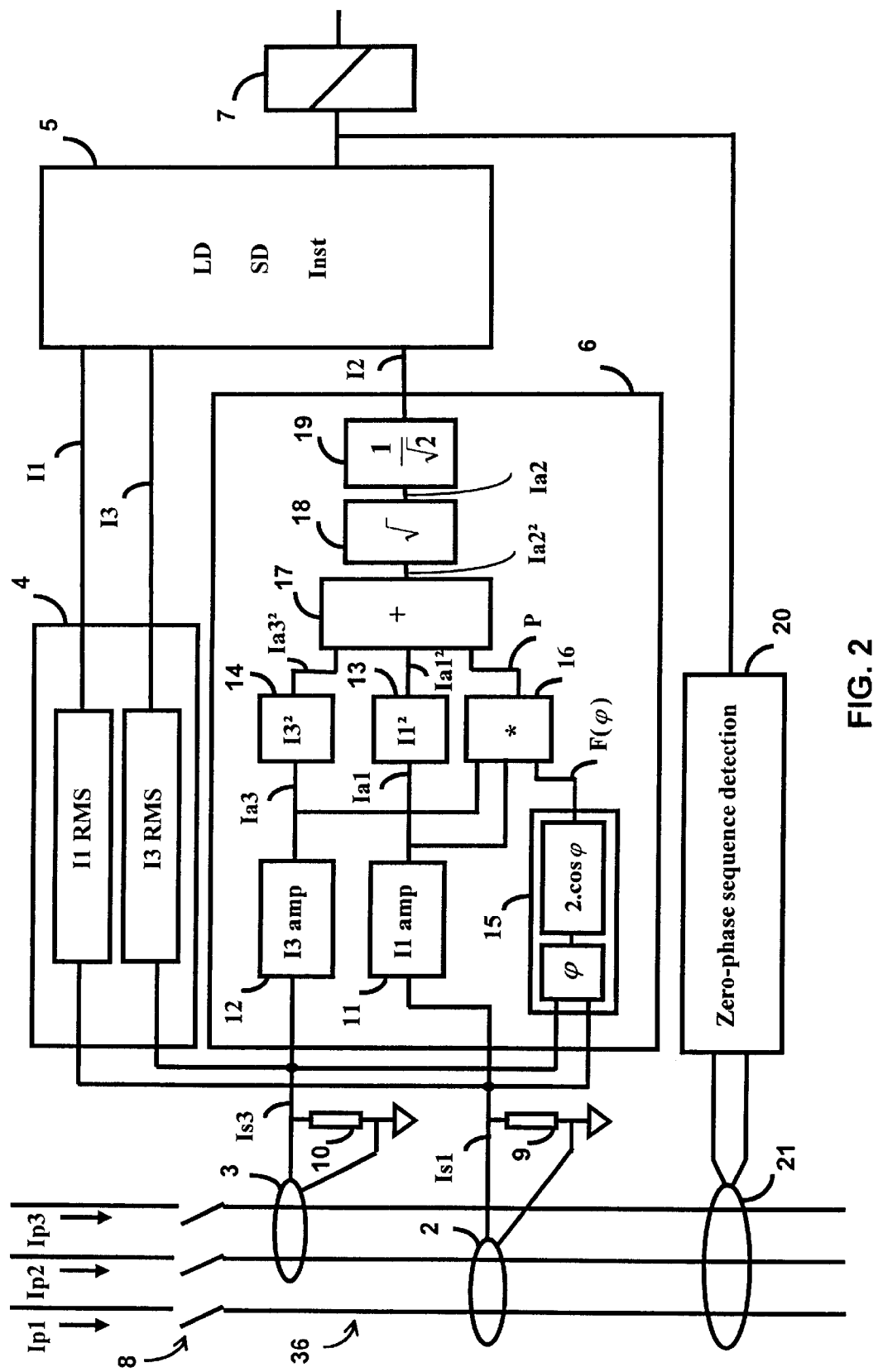
FIG. 2 represents the wiring diagram of a trip device with reconstitution according to an embodiment of the invention.

FIG. 2 shows a trip device according to one embodiment of the invention. The sensors 2 and 3 are each arranged on a main primary conductor 36 to measure in this diagram the current of phase 1 and that of phase 3. These sensors 2 and 3 are in particular current transformers whose secondary winding supplies a current which flows in a measuring resistor respectively 9 and 10.

Signals Is1 and Is3 representative of the currents Ip1 and Ip3 are applied to the processing circuit 4 which determines for example rms values I1 and I3 of said current signals.

In the embodiment of FIG. 2, the reconstitution circuit receives the signals Is1 and Is3 and supplies a reconstituted signal I2.

The signals Is1 and Is3 are applied to modules 11 and 12 which determine amplitude signals Is1 and Is3 representative of the signals Is1 and Is3 respectively. For example, the signals Ia1 and Ia3 can be detected by one of the peak detectors. A response from sensors such as current transformers is more linear and less sensitive to deformations than responses in instantaneous values or in rms values.

In other embodiments of the invention, the values of the amplitudes Ia1 and Ia3 can also be determined from the rms values I1 and I3 supplied by the circuit 4, for example by making a square root of said values. It is also possible to determine Ia1 and Ia3 by performing filterings or Fourier transforms of the signals Is1 and Is3.

The signals Ia1 and Ia3 are applied to modules 13 and 14 which determine squares $Ia1^2$ and $Ia3^2$ of the amplitude signals Ia1 and Ia2.

The reconstitution circuit 6 comprises a module 15 receiving signals representative of the signals Is1 and Is3 to determine a signal $F(\psi)$ according to the phase shift between said signals Is1 and Is3.

Preferably the module 15 determines a phase shift signal $\psi$ between the signals Is1 and Is3 then determines the cosine of the phase shift signal $\psi$. The value of the cosine can be multiplied by a factor two.

The amplitude signals Ia1, Ia3 and the signal $F(\psi)$ are supplied to a module 16 which makes the product of said signals.

The module 16 supplies a signal P representative of the product of the amplitude signals Ia1 and Ia3 and of the signal $F(\psi)$.

Then a summing module 17 makes the squared sum of the amplitude signals $Ia1^2$ and $Ia3^2$ and of the product signal P. The module 17 thus supplies a signal $Ia2^2$ representative of the amplitude of the reconstituted phase raised to the power two.

The signal $Ia2^2$ is applied to a module 18 which calculates the square root Ia2 of said signal $Ia2^2$. Then a module 19 determines the rms value I2 of the reconstituted signal representative of the current Ip2 of the reconstituted phase.

The signals I1, I3 supplied by the circuit 4 and the reconstituted signal I2 are applied to the tripping function processing circuit 5.

The following equations represent signals determined by a reconstitution circuit in a particular embodiment of the invention as represented in FIG. 2.

An equation (1) represents the signal $F(\psi)$ dependant on the phase shift signal.

$$F(\psi)=2*\cos(\psi) \qquad (1)$$

An equation (2) represents the signal P representative of the product of the signals $Ia1^2$, $Ia3^2$ and $F(\psi)$.

$$P=2*Ia3*\cos(\psi) \qquad (2)$$

An equation (3) represents the signal $Ia2^2$ reconstituting the squared value of the amplitude of the reconstituted phase current.

$$Ia2^2=Ia1^2+Ia3^2+(2*Ia1*Ia3*\cos(\psi)) \qquad (3)$$

An equation (4) represents the signal Ia2 of the amplitude of the reconstituted phase current.

$$Ia2=\sqrt{Ia1^2+Ia3^2+2*Ia1*Ia3*\cos(\psi)} \qquad (4)$$

An equation (5) represents the signal I2 representative of the rms current of the reconstituted phase.

$$I2=1/\sqrt{2}*\sqrt{Ia1^2+Ia3^2+(2*Ia1*Ia3*\cos(\psi))} \qquad (5)$$

Advantageously a zero-phase sequence current detection device 20 makes it possible to check if the vector sum of the primary currents Ip1, Ip2 and Ip3 is appreciably zero. If, in the embodiment of FIG. 2, a current Ip2 is flowing in the circuit without returning via Ip1 or Ip3, it will in fact not be reconstituted.

The detection circuit 20 connected to a zero-phase sequence current sensor 21 therefore enables protection of the electrical circuits to be achieved even if a single current is flowing in the phase which is not measured.

The device 20 can command the relay 7 directly when a signal representative of a zero-phase sequence current exceeds a preset threshold. It is also possible to integrate the device 20 in a specialized device for earth or zero-phase sequence protection tripping functions.

Figure 3:
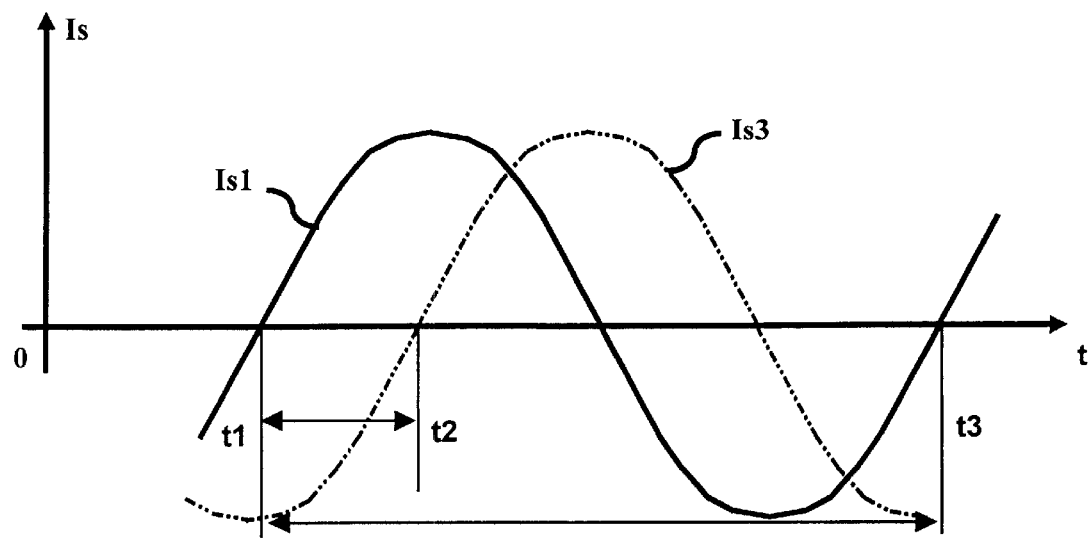
FIG. 3 illustrates output signals from two current sensors and a phase shift detection mode.

FIG. 3 shows signals Is1 and Is3 and a detection mode of the phase shift between said signals. For example, at a time t1, the signal Is1 passes above zero and is rising. Then, at a time t2, the signal Is3 passes above zero and is rising. Then, at a time t3, the signal Is1 again passes above zero and is rising.

In a trip device according to one embodiment of the invention, the period of a phase signal is determined by detecting the time elapsed between the times t1 and t3 (t3−t1), and a phase shift signal S(ψ) is determined by calculating the ratio of a time elapsed between the times t1 and t2 (t2−t1) and the period (t3−t1). The phase shift signal S(ψ) can be represented by an equation (6) as follows:

$$S(\psi) = (t3-t1)/(t2-t1) \quad (6)$$

In this case, the signal S(ψ) can take a value between 0 and 1 representative of a phase shift between 0 and 360 in degrees or between 0 and 2π in radians.

To improve the performances of the trip device the reconstitution device can operate in different ways according to the current from the sensors. For example, reconstitution in conventional manner up to a first current level in the sensors can operate according to one embodiment of the invention between the first current level and a second current level, then operate in instantaneous tripping without reconstitution when the current exceeds the second current level or an instantaneous tripping threshold.

Figure 4:
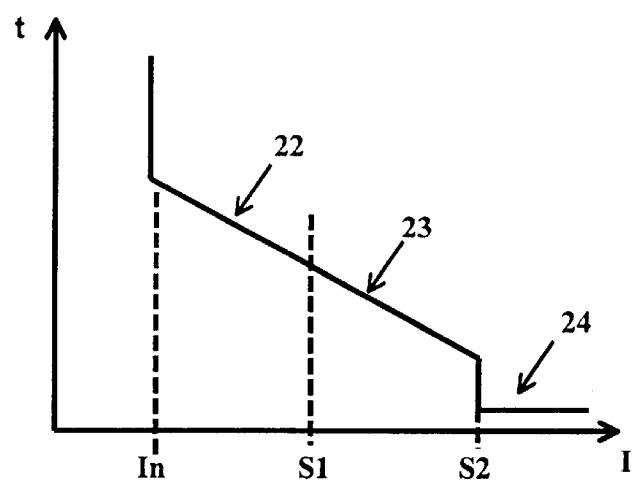
FIG. 4 shows a tripping curve of a trip device according to an embodiment of the invention having at least two reconstitution zones.

A trip device according to one embodiment of the invention can operate according to zones illustrated on the tripping curve represented in FIG. 4. For example, in a first zone 22 lower than a first threshold S1 the trip device operates according to a first reconstitution mode.

In a second zone 23 higher than the first threshold and lower than a second threshold S2, the trip device operates according to a reconstitution mode as described in FIG. 2, and above the threshold S2 the trip device operates without reconstitution in a zone 24. For example, the first threshold S1 may be about five times a rated current In of the trip device and the second threshold S2 may be ten times the rated current In.

Figure 5:
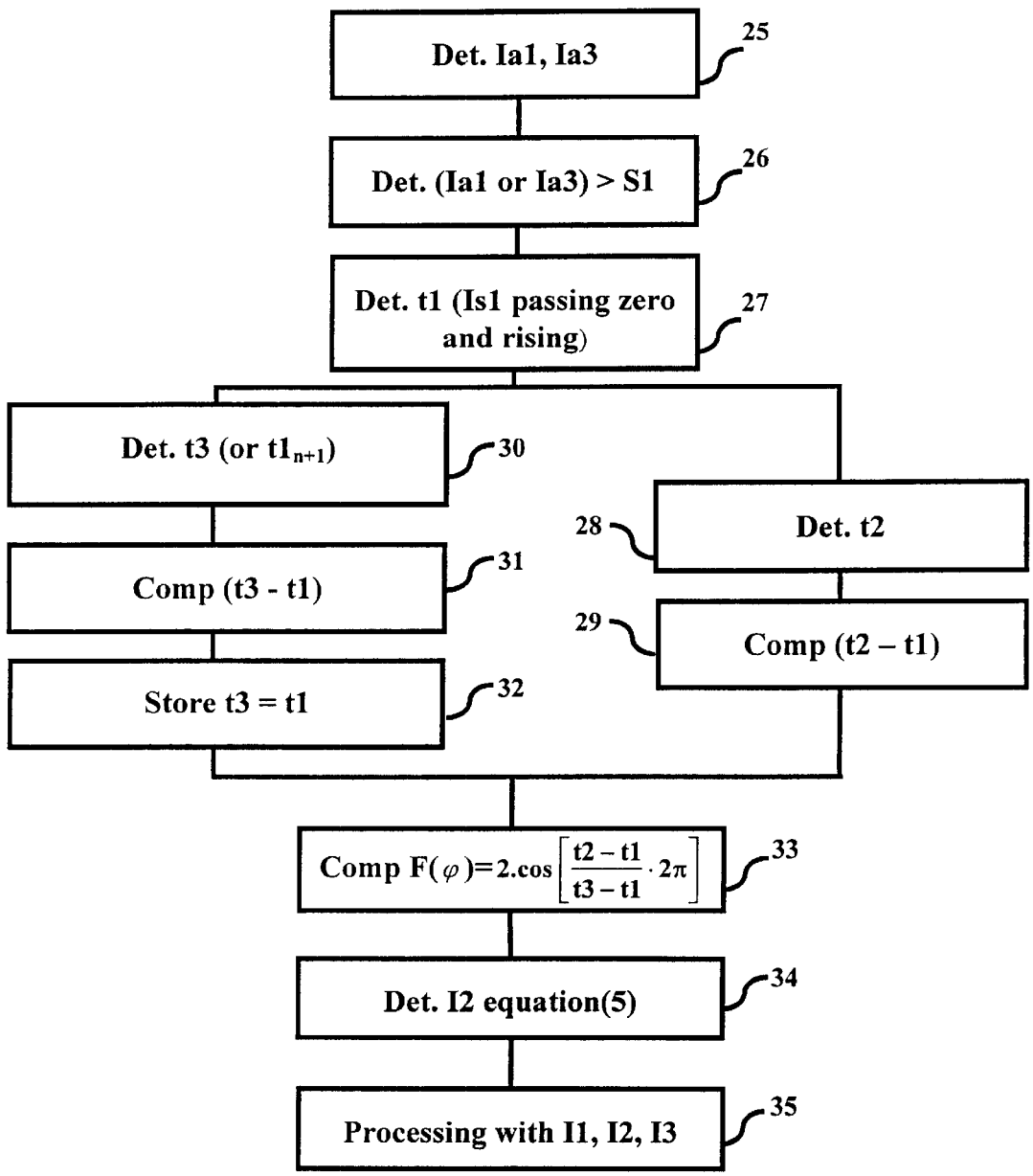
FIG. 5 shows a flowchart of operation of a trip device with phase reconstitution according to an embodiment of the invention.

FIG. 5 shows a flowchart of operation of a trip device with phase reconstitution according to one embodiment of the invention.

In a stage 25, the trip device determines the amplitudes Ia1 and Ia3 of the measured currents. Then, in a stage 26, the measured currents are compared with a threshold S1 to determine the reconstitution mode. If the threshold S1 is exceeded, reconstitution is performed according to a reconstitution mode which uses the amplitudes of the measured currents.

The current Is1 passing zero and rising is detected at a time t1 in a stage 27. Then the current signal Is2 passing zero and rising is detected at a time t2 in a stage 28. In a stage 29, the time t2−t1 is computed to determine the phase shift In a stage 30, the signal Is1 again passing zero and rising is detected at a time t3. This time t3 can also be considered as a new time t1(n+1) for computation of a phase shift in a following cycle.

Computation of the period of the signal Is1 (t3−t1) is performed in a stage 31. A stage 32 enables the time t3 to be stored as a time t1 used in computation of the following cycle.

In a stage 33, a signal F(ψ) representative of the phase shift is computed. Then, in a stage 34 a reconstituted signal I2 is computed for example according to a calculation represented by equation (5).

The tripping functions are processed in a stage 35 using the current signals I1, I2 and I3.

Figure 6:
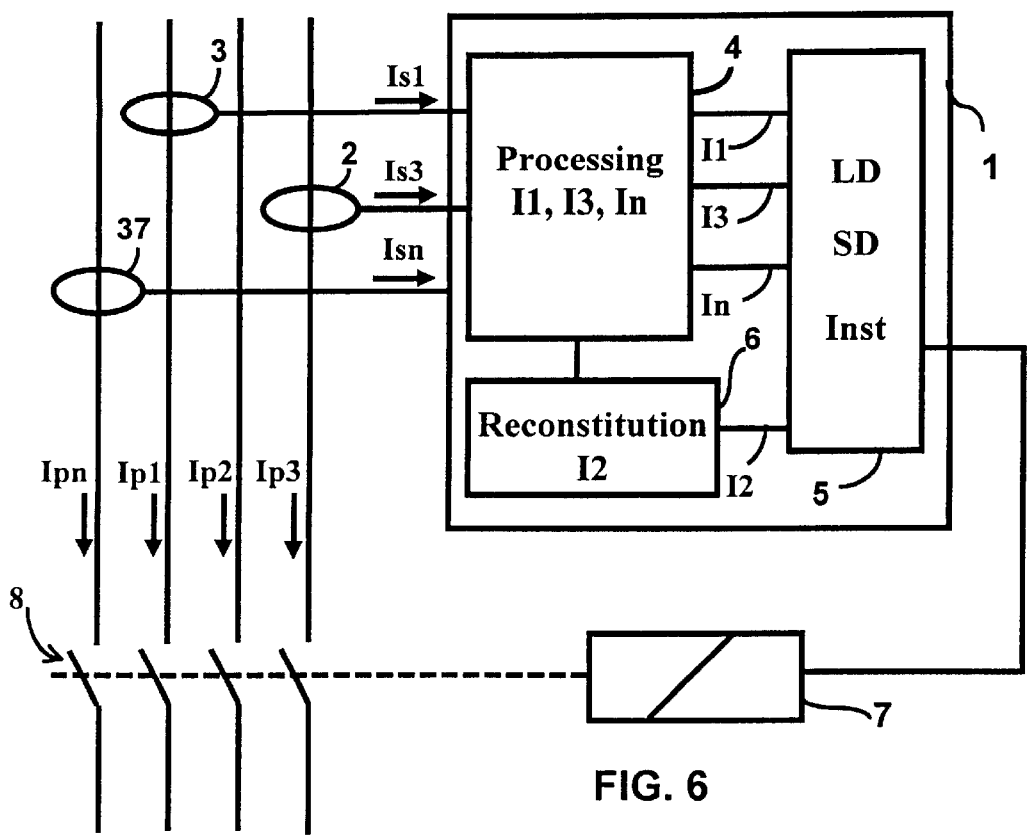
FIGS. 6 and 7 show other embodiments of a trip device according to the invention for a circuit breaker comprising four poles.
Figure 7:
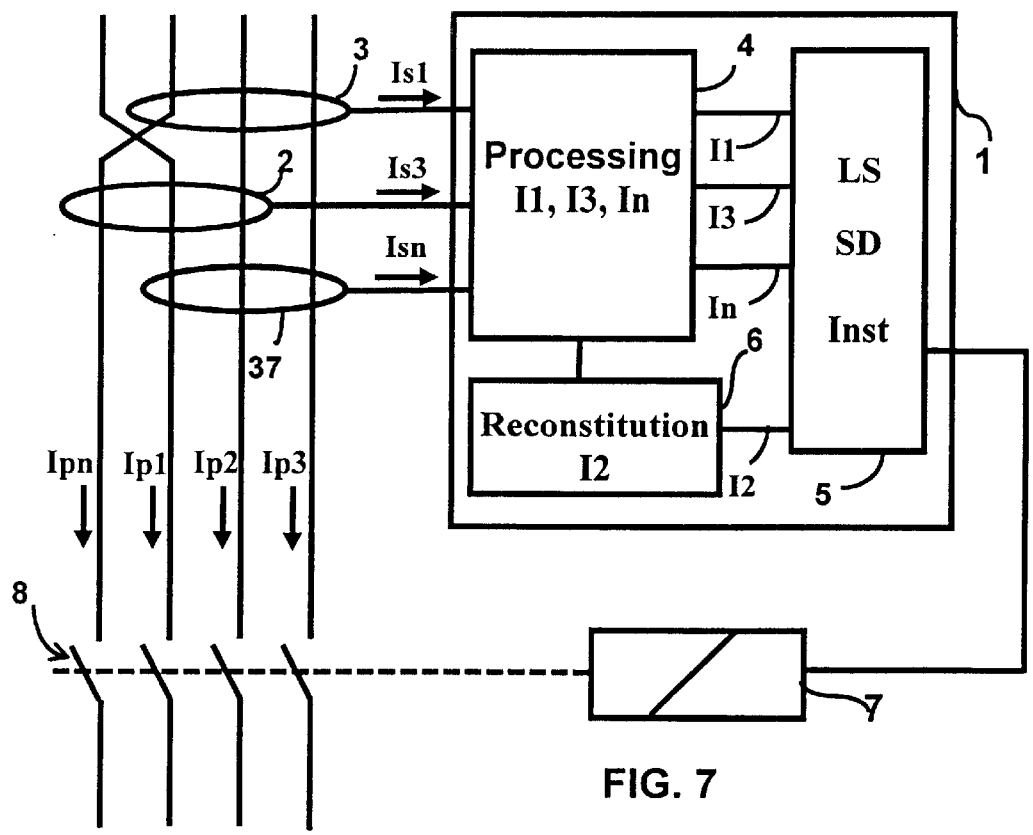

FIGS. 6 and 7 show other embodiments of a trip device according to the invention for a circuit breaker comprising four poles. In these figures, the four poles are for example the three phases and the neutral. Thus, in FIGS. 6 and 7, a current sensor 37 supplies to the processing circuit 4 a signal Isn representative of a primary neutral current Ipn. In this case, the reconstitution circuit 6 also receives a signal representative of the signal Isn and the processing circuit 5 receives a signal In representative of the neutral current processed by the circuit 4.

In these embodiments, the reconstitution circuit 6 supplies a reconstituted signal I2 according to the signals Is1, Is3 and Isn. The circuit 6 preferably reconstitutes the value of the signal I2 in two steps.

In a first step, an intermediate value I0 is determined according to the amplitude signals Ia1 and Ia3 and to a phase shift signal ψ3, cos(ψ3), or F(ψ3) between the signals Is1 and Is3. For example, an amplitude signal Ia0 of the intermediate signal I0 is preferably determined as equation (4).

An equation (7) represents the signal Ia0 of the amplitude of the reconstituted intermediate signal.

$$Ia0 = \sqrt{Ia1^2 + Ia3^2 + 2*Ia1*Ia3*\cos(\psi3)} \quad (7)$$

A phase shift ψ0 of the signal Ia0 can be determined according to the equations 8, 9 or 10.

$$\varphi 0 = \arctan\left(\frac{IP3 \cdot \sin(\varphi)}{IP3 \cdot \cos(\varphi) + IP1}\right) \quad (8)$$

$$\varphi 0 = \arcsin\left(\frac{IP3 \cdot \sin(\varphi)}{IP0}\right) \quad (9)$$

$$\varphi 0 = \arccos\left(\frac{IP3 \cdot \cos(\varphi) + IP1}{IP0}\right) \quad (10)$$

In a second step, an amplitude value Ia2 and/or an rms value I2 of the reconstituted phase signal is determined according to the intermediate amplitude signal Ia0 dependent on Ia1, Ia3 and on a neutral signal Ian representative of the amplitude of the signal Isn and a phase shift signal ψ0 cos(ψ0), or F(ψ0) between the signals Is0 and Isn. Determination of the signal I2 or Ia2 is preferably performed according to the same method as that defined in equations 3, 4, 5 and 7. Thus, even in an embodiment for a four-pole circuit breaker, the value of I2 is reconstituted according to the amplitudes of Is1 and Is3 giving I0 and to a phase shift ψ0 dependant on the phase shift between the signals Is1 and Is3, the signal Isn being used in an additional stage.

All the circuits and modules described in the above embodiments can be grouped on a single circuit and be integrated in a circuit breaker.

These circuits can be achieved in analog and/or digital forms.

All the functions can be achieved in hardwired manner or be programmed in a micro-processor or a microcontroller.

The sensors 2 and 3 can each surround one or two conductors for measurement of the primary current. When the sensors surround two conductors, power supply of the trip device by the current sensors can be performed in all configuration cases.

The trip device can be supplied by the current sensors 2 and 3 by an auxiliary power supply and/or by a zero-phase sequence current sensor.

Other functions using reconstituted current signals can be associated to the trip device.

These functions can, for example, be display of current values or communication functions.

The trip device described above is preferably integrated in a three-phase circuit breaker but it could also be achieved independently and operate as a protection relay.

What is claimed is:

1. A trip device with phase reconstitution comprising:

at least two sensors arranged on main conductors to be protected, and a processing unit comprising means for processing the current signals connected to the sensors, means for phase reconstitution configured for receiving signals representative of the current signals supplied by the sensors, and means for processing tripping functions connected to the means for processing the current signals and to the means for reconstitution, said means for phase reconstitution comprising:

first means for determining signals representative of the amplitudes of the current signals supplied by the two sensors, second means for determining a signal representative of a phase shift between signals representative of the signals supplied by the two sensors, and third determining means, connected to the first and second determining means, for determining a signal representative of a phase current reconstituted according to the signals representative of the amplitudes and to the signal representative of a phase shift of the signals supplied by the two sensors.

2. The trip device according to claim 1, wherein the second determining means comprise means for computing the cosine of the phase shift between the signals representative of the signals supplied by the two sensors.

3. The trip device according to claim 1, wherein the second determining means comprise means for determining times when the signals supplied by the current sensors pass zero in a predetermined direction, said times being a first time when a first signal passes zero, a second time when a second signal passes zero and a third time when a first signal again passes zero, a signal representative of the phase shift being appreciably proportional to the ratio of a time between the first and second times over a time between the first and third times corresponding to the period of the first signal.

4. The trip device according to claim 1, wherein the third determining means comprise first means for computing a product signal to calculate the product of the signals representative of the amplitudes and of the signal representative of a phase shift.

5. The trip device according to claim 4, wherein the third determining means comprise second means for computing a sum signal to calculate the sum of the squared amplitude signals and of the product signal.

6. The trip device according to claim 1, comprising means for determining zero-phase sequence current comprising a current sensor arranged on all of the main conductors.

7. The trip device according to claim 1, wherein the means for reconstitution use the signal supplied by the third determining means when at least one of the current signals supplied by the two sensors exceeds a first preset threshold.

8. The trip device according to claim 1, wherein each current sensor surrounds two main conductors.

9. The trip device according to claim 1, comprising at least three sensors arranged on main conductors to be protected, the first determining means determining signals representative of the amplitudes of the current signals supplied by the sensors, and the third determining means connected to the first and second determining means determining a signal representative of a phase current reconstituted according to the signals representative of the amplitudes, to the signal representative of a phase shift of the signals supplied by two sensors, and to a signal supplied by a third sensor.

10. A circuit breaker comprising at least three contacts connected in series with main conductors comprising a trip device according to claim 1.

* * * * *